United States Patent
Odamaki

(10) Patent No.: US 8,218,911 B2
(45) Date of Patent: Jul. 10, 2012

(54) IMAGE PROCESSING APPARATUS AND IMAGE PROCESSING METHOD

(75) Inventor: Makoto Odamaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1006 days.

(21) Appl. No.: 12/000,830

(22) Filed: Dec. 18, 2007

(65) Prior Publication Data

US 2008/0159650 A1   Jul. 3, 2008

(30) Foreign Application Priority Data

Dec. 27, 2006   (JP) ................ 2006-352520

(51) Int. Cl.
| G06K 9/46 | (2006.01) |
| G06K 9/20 | (2006.01) |
| G06K 9/36 | (2006.01) |
| G06K 9/54 | (2006.01) |
| G06K 9/60 | (2006.01) |
| G09G 5/00 | (2006.01) |
| G06F 15/00 | (2006.01) |
| G06F 15/76 | (2006.01) |

(52) U.S. Cl. ........ 382/302; 382/237; 382/283; 382/303; 382/304; 382/276; 345/619; 712/10; 712/12; 712/15; 712/28; 712/37

(58) Field of Classification Search ................ 382/283, 382/302
See application file for complete search history.

(56) References Cited

U.S. PATENT DOCUMENTS

| 5,883,979 A * | 3/1999 | Beretta et al. ............. 382/251 |
| 6,317,159 B1 * | 11/2001 | Aoyama .................... 348/458 |
| 6,330,050 B1 * | 12/2001 | Takahashi et al. ........ 355/25 |
| 6,389,174 B1 * | 5/2002 | Liu et al. ................... 382/240 |
| 6,608,930 B1 * | 8/2003 | Agnihotri et al. ......... 382/176 |
| 7,013,424 B2 * | 3/2006 | James et al. ............... 715/239 |
| 7,110,604 B2 * | 9/2006 | Olsson ...................... 382/224 |
| 7,162,716 B2 * | 1/2007 | Glanville et al. .......... 717/151 |
| 7,185,226 B2 * | 2/2007 | Chen et al. ................. 714/13 |
| 7,554,683 B2 * | 6/2009 | Kobayashi et al. ....... 358/1.14 |
| 7,849,241 B2 * | 12/2010 | Gschwind et al. ........ 710/68 |
| 8,108,656 B2 * | 1/2012 | Katragadda et al. ...... 712/215 |
| 2005/0057593 A1 * | 3/2005 | Kachi ......................... 347/14 |
| 2005/0180645 A1 * | 8/2005 | Hasegawa et al. ........ 382/239 |
| 2005/0220353 A1 * | 10/2005 | Karczewicz et al. ..... 382/238 |
| 2006/0133690 A1 * | 6/2006 | Bloomberg et al. ...... 382/269 |
| 2006/0140487 A1 * | 6/2006 | Tabata et al. .............. 382/232 |
| 2006/0215231 A1 * | 9/2006 | Borrey et al. ............. 358/448 |
| 2006/0262986 A1 * | 11/2006 | Ohk .......................... 382/243 |
| 2006/0290703 A1 * | 12/2006 | White et al. .............. 345/522 |
| 2007/0002392 A1 * | 1/2007 | Ogura ....................... 358/448 |

FOREIGN PATENT DOCUMENTS

| EP | 720349 A1 * | 7/1996 |
| JP | 2611012 | 2/1997 |
| JP | 3253356 | 11/2001 |
| JP | 2006-197178 | 7/2006 |
| JP | 2006-238405 | 9/2006 |

* cited by examiner

Primary Examiner — Michelle Entezari
(74) Attorney, Agent, or Firm — Harness, Dickey & Pierce, P.L.C.

(57) ABSTRACT

An image processing apparatus which applies processes to input image data is disclosed. The image processing apparatus includes a first processing section which applies processes to the image data by a specific calculating device, and a second processing section which applies processes to the image data by a general-purpose calculating program. The input image data are multilevel image data. The first processing section includes an image data binarizing unit for forming binary image data from the multilevel image data, and a multilevel image data processing section for applying a calculation process to the multilevel image data. The second processing section includes a binary image data processing section for applying a calculation process to the binary image data formed by the image data binarizing unit.

19 Claims, 13 Drawing Sheets

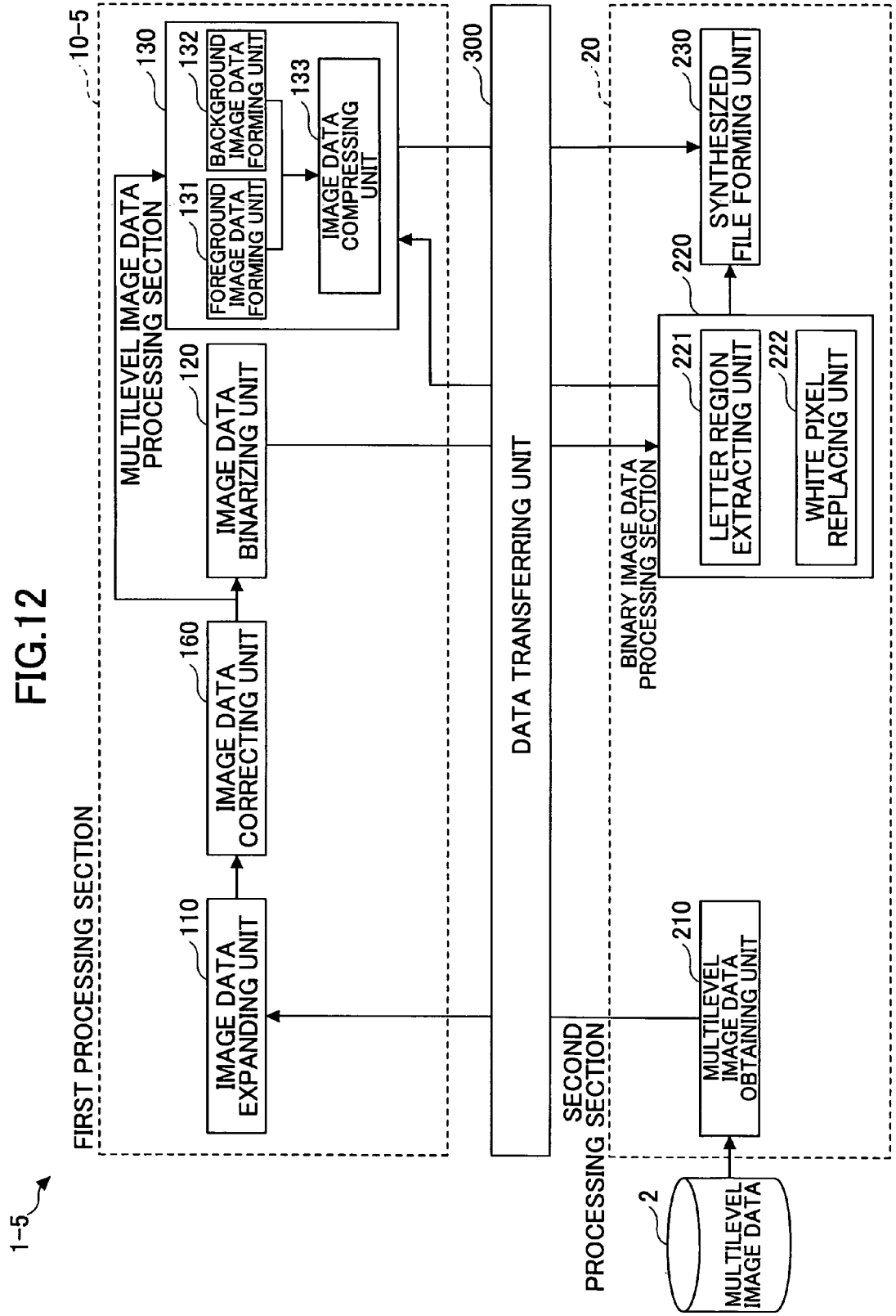

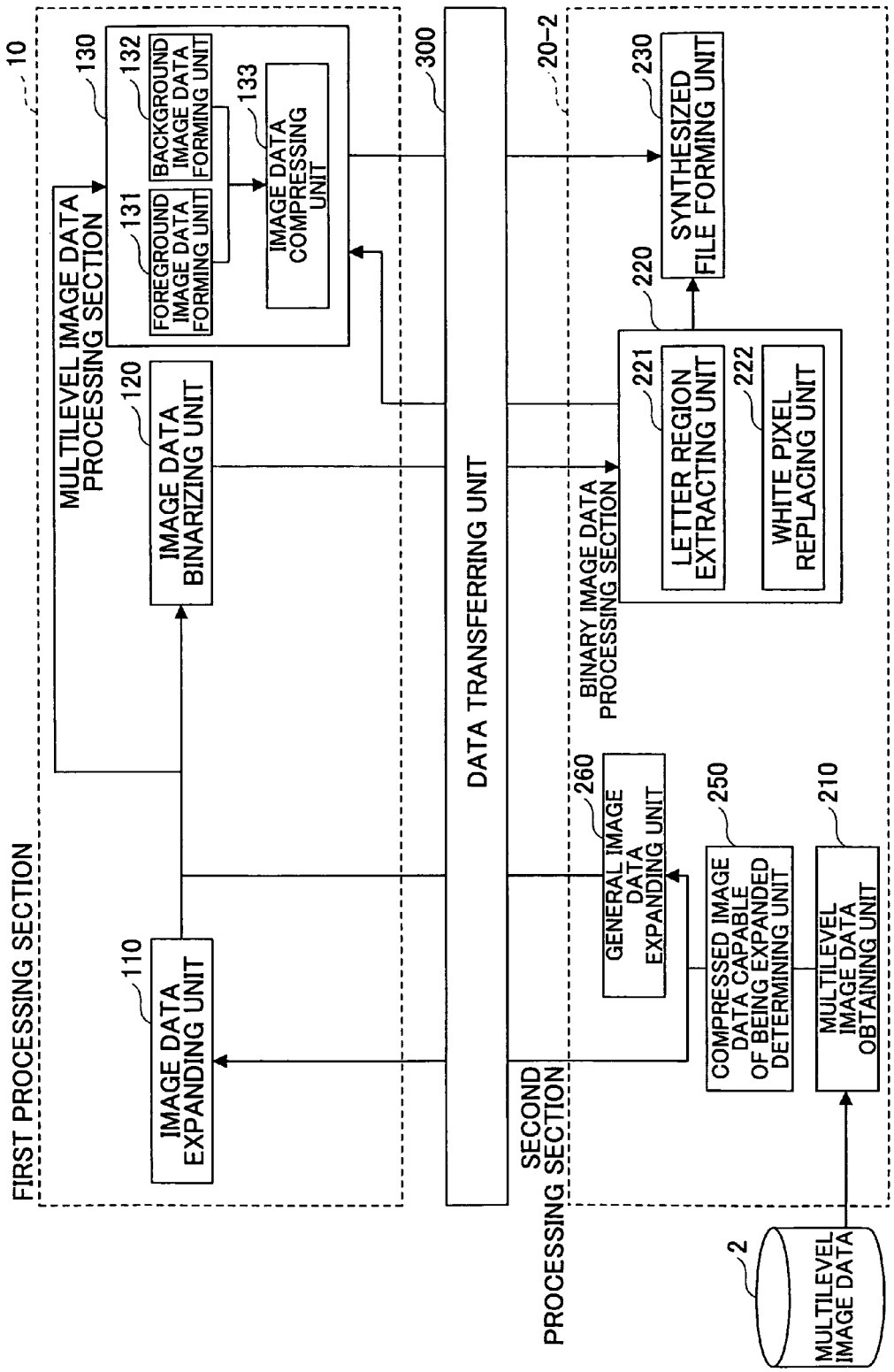

IMAGE PROCESSING APPARATUS AND IMAGE PROCESSING METHOD

BACKGROUND OF THE INVENTION

1. Field of the Invention

The present invention generally relates to an image processing apparatus and an image processing method in which image data can be processed at high speed.

2. Description of the Related Art

Recently, documents have been digitized by reading the documents by, for example, a scanner. When the size of image data of a digitized document is large, it takes a long time to transfer, store, and reproduce the digitized document. For example, when a document of A4 size (210 mm×297 mm) is read by a scanner and image data of the read document are stored in a full-color bitmap format in which resolution is 300 dpi and each RGB pixel has 8 bits per color, the size of a storage unit must be approximately 25 MB. Consequently, when the image data are transferred and stored, a wide transferring band and a large amount of storage must be provided.

In order to solve the above problem, image data are compressed and the compressed image data are transferred and stored. As the compression method, JPEG (Joint Photographic Experts Group) compression can be used. However, in a case where the JPEG compression is used, when image data of a letter region (text region) having a rapid and complex density change are compressed, the compressed image data may not have sufficient reproducibility. In order to solve the problem, in a method, the image data of the letter region are separated from image data of a photographic region (non-letter region), suitable compression methods are applied to the corresponding image data of the letter region and the photographic region, and image data of a full-color document are reproduced while maintaining high quality of the letter region. As such as method, there is a compact PDF (portable document format) technology.

In Patent Document 1, image data are separated into image data of a letter region and image data of a line drawing region; the image data of the letter region are compressed by JPEG and the image data of the line drawing region are recursively compressed by MMR (MODIFIED MODIFIED READ) compression. In patent document 2, image data of a letter region are extracted and image data of a multilevel background region are superposed by using coordinates. In Patent Document 3, image data of a letter region and image data of a non-letter region are displayed by switching between them by using mask data in which the image data of the non-letter region are formed of white pixels.

[Patent Document 1] Japanese Patent No. 2611012 (Japanese Laid-Open Patent Application No. 3-104380)
[Patent Document 2] Japanese Laid-Open Patent Application No. 2006-238405
[Patent Document 3] Japanese Laid-Open Patent Application No. 2006-197178

However, in Patent Document 1, only a character separation coding method is disclosed. In addition, in Patent Documents 2 and 3, when a full-color document is reproduced with a small data size while maintaining high quality of the letter region, many image data processing processes are required and the processes need plenty of periods.

SUMMARY OF THE INVENTION

In a preferred embodiment of the present invention, there is provided an image processing apparatus and an image processing method in which image data are processed at high speed.

Features and advantages of the present invention are set forth in the description that follows, and in part will become apparent from the description and the accompanying drawings, or may be learned by practice of the invention according to the teachings provided in the description. Features and advantages of the present invention may be realized and attained by an image processing apparatus and an image processing method particularly pointed out in the specification in such full, clear, concise, and exact terms so as to enable a person having ordinary skill in the art to practice the invention.

To achieve one or more of these and other advantages, according to one aspect of the present invention, there is provided an image processing apparatus which applies processes to input image data. The image processing apparatus includes a first processing section which applies processes to the image data by a specific calculating device, and a second processing section which applies processes to the image data by a general-purpose calculating program. When the second processing section can execute a process at a speed higher than the speed in the first processing section, the second processing section executes the process.

According to another aspect of the present invention, there is provided an image processing apparatus which applies processes to input image data. The image processing apparatus includes a first processing section which applies processes to the image data by a specific calculating device, and a second processing section which applies processes to the image data by a general-purpose calculating program. The input image data are multilevel image data, the first processing section includes an image data binarizing unit for forming binary image data from the multilevel image data, and a multilevel image data processing section for applying a calculation process to the multilevel image data; and the second processing section includes a binary image data processing section for applying a calculation process to the binary image data formed by the image data binarizing unit.

According to another aspect of the present invention, there is provided an image processing method in an image processing apparatus that includes a first processing section which applies processes to input multilevel image data by a specific calculating device, and a second processing section which applies processes to the input multilevel image data by a general-purpose calculating program. The image processing method includes a binary image data forming step for forming binary image data from the input multilevel image data at the first processing section, a multilevel image data processing step for processing the input multilevel image data at the first processing section, and a binary image data processing step for processing the binary image data formed at the binary image data forming step in the second processing section.

EFFECT OF THE INVENTION

According to an embodiment of the present invention, an image processing apparatus includes a first processing section which applies processes to input image data by a specific calculating device, and a second processing section which applies processes to the input image data by a general-purpose calculating program. The input image data are multilevel image data, the first processing section includes an image data binarizing unit for forming binary image data from the multilevel image data, and a multilevel image data processing section for applying a calculation process to the multilevel image data; and the second processing section includes a binary image data processing section for applying a calculation process to the binary image data formed by the image data binarizing unit. Therefore, the processes in the image processing apparatus can be executed at high speed while maintaining high quality of the image data.

BRIEF DESCRIPTION OF THE DRAWINGS

Features and advantages of the present invention will become more apparent from the following detailed description when read in conjunction with the accompanying drawings, in which:

FIG. 12 is a diagram showing a functional structure of an image processing apparatus according to a sixth embodiment of the present invention; and FIG. 13 is a diagram showing a functional structure of an image processing apparatus according to a seventh embodiment of the present invention.

DESCRIPTION OF THE PREFERRED EMBODIMENTS

Best Mode of Carrying Out the Invention

The best mode of carrying out the present invention is described with reference to the accompanying drawings.

When processes in an image processing apparatus are executed at high speed, a device which can execute simple and repeating calculations at high speed is used. That is, for example, an ASIC (application specific integrated circuit), an FPGA (field programmable gateway array), a DSP (digital signal processor), a configurable processor, a reconfigurable processor, or a MIMD (multiple instruction/multiple data) device is used.

However, for example, in an image data compression process, complex processes are included. The complex processes include a specific attribute region extracting process (letter region extracting process) which includes a bit calculation process, a conditional branch calculation process, and an exceptional calculation process. Therefore, when the above device is used, high-speed operations are hardly executed.

In addition, when the above described device is used for executing only the simple and repeating calculations, as described above, since the size of image data of a paper document is large in the processes, it takes a long time for transferring the image data among devices, and all the processes cannot be executed at high speed.

In order to solve the above problem, the embodiments of the present invention provide a first processing section which executes calculation processes by using a specific calculation processing device and a second processing section which executes calculation processes by using a general-purpose calculation processing program. The first processing section has superiority in simple repeating calculations such as product-sum operations. The second processing section has general superiority for complex calculations such as conditional branch calculations. The first and second processing sections execute corresponding suitable processes. That is, when there are image data processes which can be executed by the second processing section at higher speed than by the first processing section, the image data processes are executed by the second processing section. With this, the processes in the image processing apparatus can be executed at high speed. That is, by combining the processes in the first and second processing sections, the processes in the image processing apparatus can be executed at high speed.

First Embodiment

Referring to FIGS. 1 through 4, an image processing apparatus 1 according to a first embodiment of the present invention is described.

[Structure of Image Processing Apparatus 1]

Figure 1:
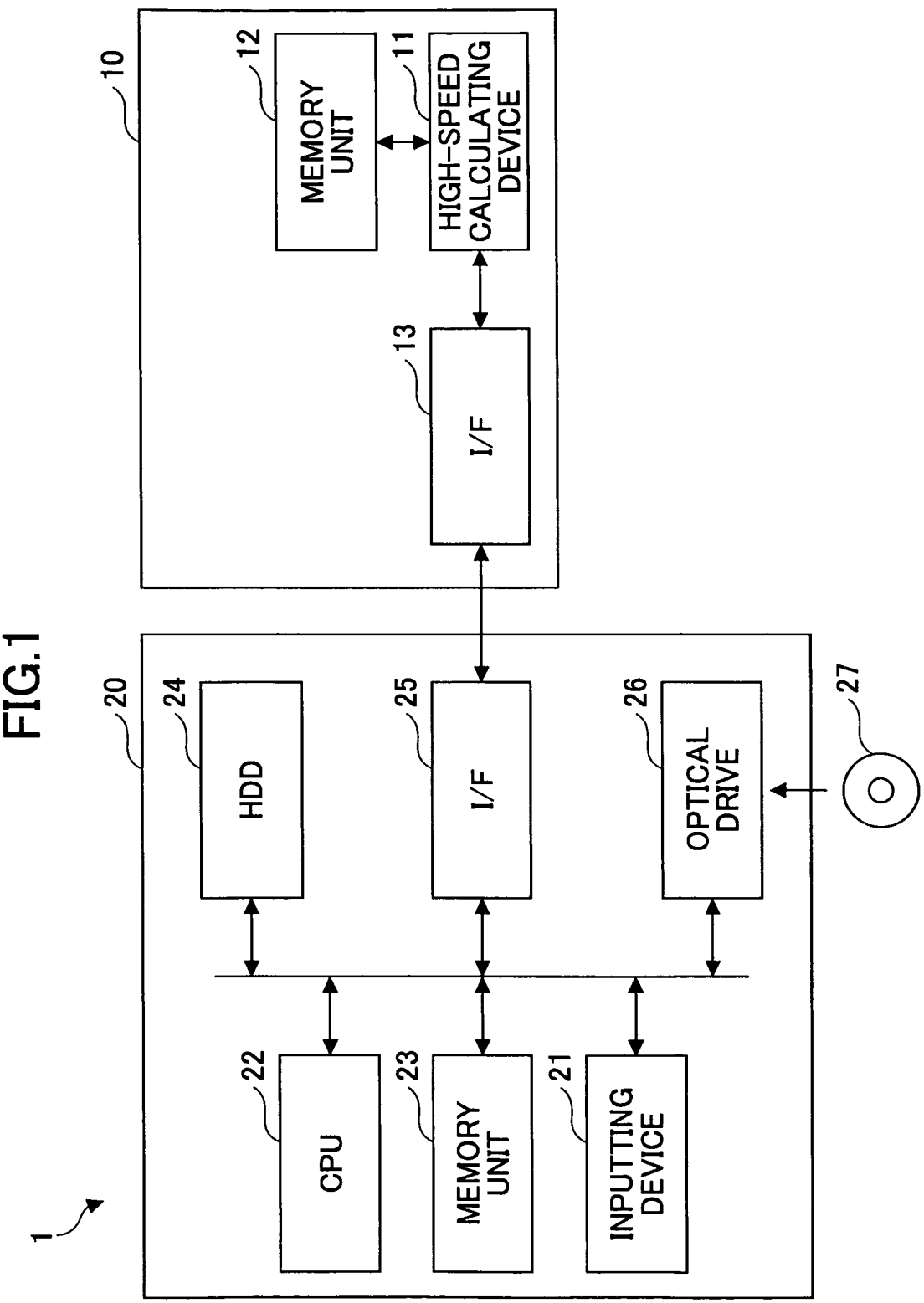
FIG. 1 is a diagram showing a structure of an image processing apparatus according to a first embodiment of the present invention.

First, referring to FIG. 1, a structure of the image processing apparatus 1 according to the first embodiment of the present invention is described. FIG. 1 is a diagram showing the structure of the image processing apparatus 1 according to the first embodiment of the present invention. As shown in FIG. 1, the image processing apparatus 1 includes a first processing section 10 which executes calculation processes by using a specific calculation processing device and a second processing section 20 which executes calculation processes by using a general-purpose calculation processing program. The first processing section 10 includes a high-speed calculating device 11, a memory unit 12, and an I/F (interface) 13. The second processing section 20 includes an inputting device 21, a CPU (central processing unit) 22, a memory unit 23, an HDD (hard disk drive) 24, an I/F 25, and an optical drive 26. The second processing section 20 is a general-purpose data processing device (computer system).

The high-speed calculating device 11 has high calculation ability in, for example, product-sum operations. The high-speed calculating device 11 is formed of, for example, an ASIC, an FPGA, a DSP, a configurable processor, a reconfigurable processor, or a MIMD device. The high-speed calculating device 11 includes an I/F (not shown) for accessing the memory unit 12 where programs and data are stored. The high-speed calculating device 11 connects to the second processing section 20 via the I/F 13.

The inputting device 21 is, for example, a scanner by which image data are read. The CPU 22 processes data and executes calculation of data. The memory unit 23 stores programs and data and is formed of a RAM and a ROM. The HDD 24 stores data and programs. The second processing section 20 connects to the first processing section 10 via the I/F 25. The optical drive 26 reads data from a recording medium 27, for example, a CD.

The first processing section 10 has superiority in executing a simple calculation process at high speed, for example, sequentially executing a calculation process at each pixel. The second processing section 20 has superiority in executing complex calculation processes such as a bit calculation process, a conditional branch calculation process, and an exceptional calculation process. In addition, the data transferring speed between the I/Fs 13 and 25 (the first processing section 10 and the second processing section 20) is preferably 50 MB/s or more. Therefore, for example, a PCI Express bus is used between the I/Fs 13 and 25.

The HDD 24 or the recording medium 27 stores programs for realizing process procedures and process functions of the image processing apparatus 1. When the high-speed calculating device 11 is a device whose circuit control information can be rewritten from an external device; that is, when the high-speed calculating device 11 is formed of, an FPGA, a DSP, a configurable processor, a reconfigurable processor, or a MIMD device, except for an ASIC, the circuit control information can be stored in the HDD 24 or the recording medium 27.

Next, operations of the image processing apparatus 1 are briefly described. First, image data of a document to be processed are input from the inputting device 21 and the input image data are stored in the memory unit 23 and/or the HDD 24. The CPU 22 reads a program for realizing the process procedures and the process functions from, for example, the recording medium 27 via the optical drive 26, and executes image processes based on the read program. The processed result is stored in the HDD 24. The processed result can be stored in the memory unit 23, the recording medium 27, or a flash memory (not shown) detachable from the second processing section 20 instead of being stored in the HDD 24. Further, the processed result can be transferred to an external device (not shown) via e-mail.

When the data transferring speed between the I/Fs 13 and 25 is high speed, making a data transferring period between the first and second processing sections 10 and 20 sufficiently small, it is considerable that the first processing section 10 does not include the memory unit 12 and only the memory unit 23 in the second processing section 20 stores the image data. However, generally, since the size of the image data to be processed by the image processing apparatus 1 is, for example, approximately 25 MB at 300 dpi resolution per an A4 size document, when the data transferring period is desired to be small, the cost for connecting the I/Fs 13 and 25 becomes high. Therefore, in the present embodiment, the first processing section 10 includes the memory unit 12.

[Functional Structure of Image Processing Apparatus 1]

Figure 2:
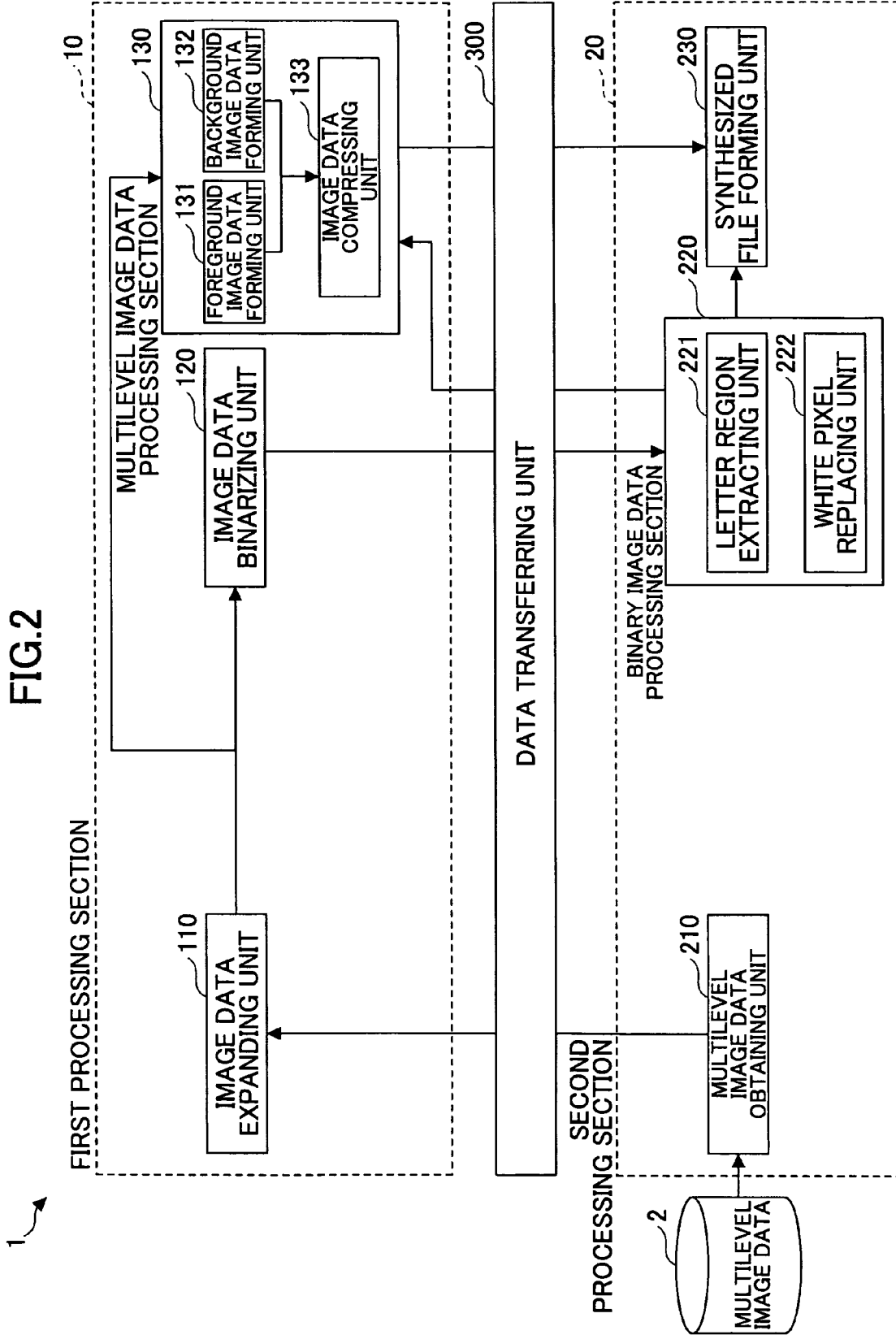
FIG. 2 is a diagram showing a functional structure of the image processing apparatus according to the first embodiment of the present invention.

Next, referring to FIG. 2, a functional structure of the image processing apparatus 1 is described. FIG. 2 is a diagram showing a functional structure of the image processing apparatus 1. As shown in FIG. 2, the first processing section 10 includes an image data expanding unit 110, an image data binarizing unit 120, and a multilevel image data processing section 130. The second processing section 20 includes a multilevel image data obtaining unit 210, a binary image data processing section 220, and a synthesized file forming unit 230. The multilevel image data processing section 130 includes a foreground image data forming unit 131, a background image data forming unit 132, and an image data compressing unit 133. The binary image data processing section 220 includes a letter region extracting unit 221 and a white pixel replacing unit 222. Further, the image processing apparatus 1 includes a data transferring unit 300.

The image data expanding unit 110 expands compressed image data and forms uncompressed image data. For example, compressed image data such as JPEG compressed image data transferred from the multilevel image data obtaining unit 210 are expanded to uncompressed image data. For example, the high-speed calculating device 11 shown in FIG. 1 executes the expansion. The image data binarizing unit 120 binarizes multilevel image data expanded by the image data expanding unit 110. The binarized image data are called binary image data. The binarization of the multilevel image data is executed by the high-speed calculating device 11. In the binarization of the image data, for example, a predetermined threshold value is provided for luminance of each pixel of the image data, when the luminance of the pixel is the threshold value or less, the pixel value is determined to be "0", and when the luminance of the pixel is more the threshold value, the pixel value is determined to be "1".

The multilevel image data processing section 130 applies operations to the multilevel image data. In the operations, for example, the foreground image data forming unit 131 forms foreground image data from the multilevel image data, the background image data forming unit 132 forms background image data from the multilevel image data, and the image data compressing unit 133 compresses the foreground and background image data. The foreground image data are image data of the letter region, the background image data are image data of a region other than the letter region.

The multilevel image data obtaining unit 210 obtains multilevel image data 2 of, for example, a full-color document. The multilevel image data are compressed image data. The multilevel image data 2 are obtained by, for example, the inputting device 21 shown in FIG. 1. The binary image data processing section 220 applies operations to the binary image data. In the operations, the letter region extracting unit 221 (specific attribute region extracting unit) extracts image data of a letter region from the binary image data. That is, the letter region extracting unit 221 extracts image data of a region having a specific attribute such as a letter region from the binary image data. The white pixel replacing unit 222 replaces pixels in image data of a region other than the letter region extracted from the letter region extracting unit 221 with white pixels. The synthesized file forming unit 230 forms a synthesized file by synthesizing plural files (image data). For example, the synthesized file forming unit 230 synthesizes image data of a result processed by the multilevel image data processing section 130 with image data of a result processed by the binary image data processing section 220.

The data transferring unit 300 transfers data between the first and second processing sections 10 and 20. That is, the data are transferred via the I/Fs 13 and 25 shown in FIG. 1. For example, the data transferring unit 300 transfers the multilevel image data 2 obtained by the multilevel image data obtaining unit 210 to the image data expanding unit 110.

In the image processing apparatus 1, processes (described below in detail) are applied to the multilevel image data 2 of, for example, a full-color document obtained by the multilevel image data obtaining unit 210 at the sections and units in the image processing apparatus 1.

The white pixel replacing unit 222 can include a mask image data forming unit. The mask image data forming unit forms letter mask image data for identifying the letter region (specific attribute region) by replacing pixels in a region other than the letter region extracted by the letter region extracting unit 221 with white pixels in the binary image data.

[Processes in Image Processing Apparatus 1]

Figure 3:
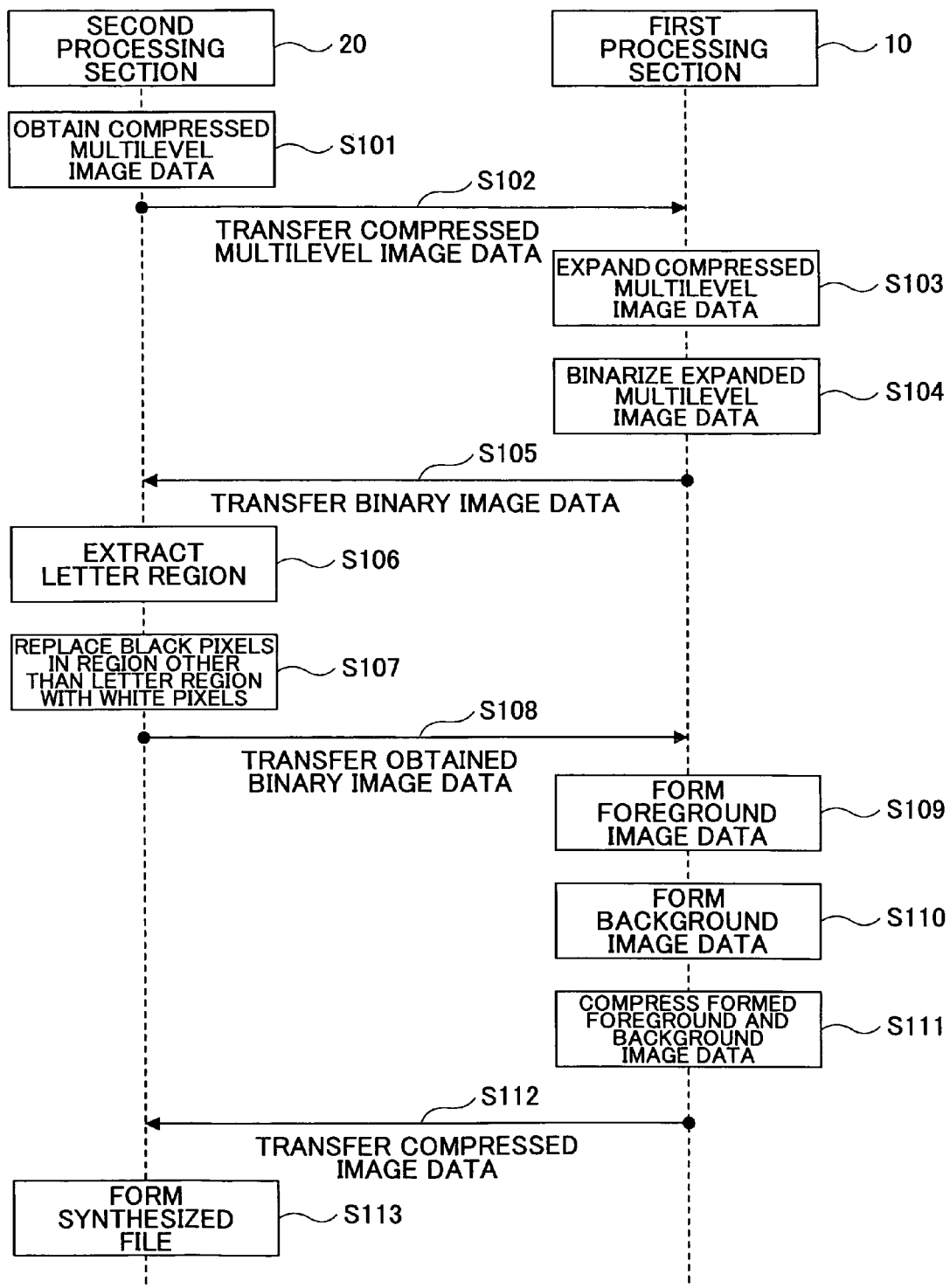
FIG. 3 is a sequence chart showing processes in the image processing apparatus shown in FIG. 2.
Figure 4:
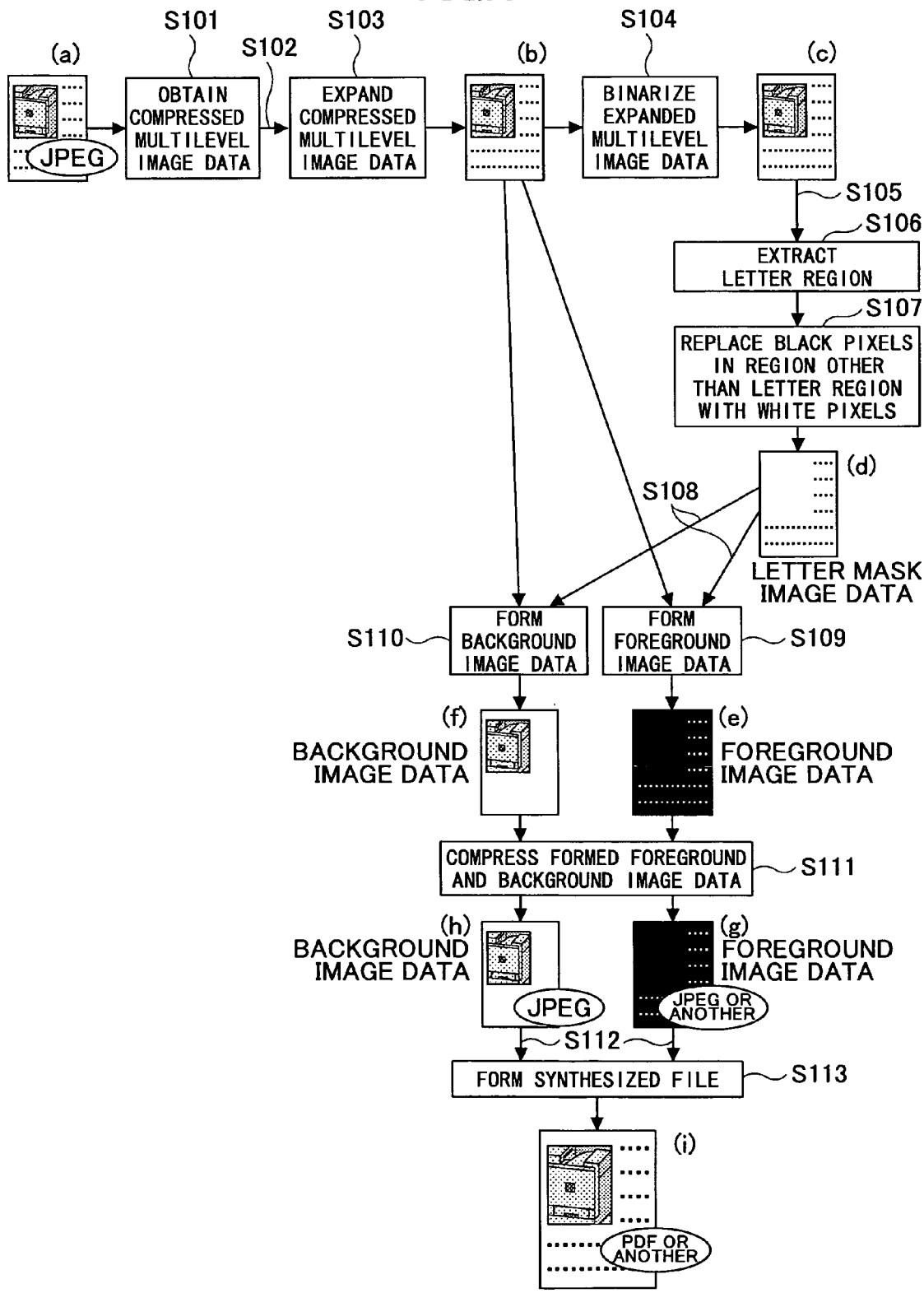
FIG. 4 is a process chart showing the processes in the image processing apparatus shown in FIG. 2.

Next, referring to FIGS. 1 through 4, processes in the image processing apparatus 1 are described. FIG. 3 is a sequence chart showing processes in the image processing apparatus 1. FIG. 4 is a process chart showing the processes in the image processing apparatus 1.

In the present embodiment, as an example, predetermined image processes are applied to a full-color document (multi-level image data) (refer to FIG. 4(*a*)), and the full-color document is reproduced (refer to FIG. 4(*i*)) with high quality by using a small data size. The full-color document is a general full-color document including a letter region (text region) and an image region (other than the letter region).

First, the multilevel image data obtaining unit 210 obtains multilevel image data 2 of a full-color document (S101) (refer to FIG. 4(*a*). In this case, the multilevel image data 2 are compressed image data in a JPEG format. The data transferring unit 300 transfers the compressed multilevel image data obtained by the multilevel image data obtaining unit 210 to the image data expanding unit 110 (S102).

The image data expanding unit 110 expands the compressed multilevel image data of the JPEG format into uncompressed multilevel image data (S103). The expanded multilevel image data are shown in FIG. 4(*b*).

The image data binarizing unit 120 binarizes the expanded multilevel image data (S104). The binarized image data (binary image data) are shown in FIG. 4(*c*). In the binarizing process, there are methods. In one method, only a G component in RGB components is used, and in another method, luminance Y is calculated from the RGB components and the luminance Y is used. When the luminance Y is used, the luminance Y is shown in the following equation.

$$Y = 0.299R + 0.587G + 0.114B$$

The above methods can be executed by simple product-sum operations; therefore, the operation can be executed at high speed in the first processing section 10. When only the G component is used, a black letter can be binarized in a level similar to using the luminance Y; however, a color letter may be binarized in a level whose image quality is lower than the method using the luminance Y. In addition, the threshold value in the binarization of the image data can be changed by using plural adjacent pixels, or the threshold value is determined to be a single value. In the present embodiment, from a viewpoint of stability and simplicity on the entire surface of the document, the single value is used as the threshold value.

The data transferring unit 300 transfers the binary image data formed by the image data binarizing unit 120 to the binary image data processing section 220 in the second processing section 20 (S105). The data size of the binary image data is smaller than that of the full-color image data, for example, the data size of the binary image data is approximately 1/24 of full-color image data formed of RGB pixel of 8 bits per each color. Therefore, the data transferring period can be reduced. The binary image data to be transferred can be compressed. In this case, the data transferring period can be further reduced. However, in this case, the compression of the binary image data is determined so that even if the compression is applied to the binary image data, the period including the compression and expansion period of the binary image data and the data transferring period of the compressed binary image data is less than the data transferring period when the compression is not applied to the binary image data.

The letter region extracting unit 221 extracts a region having a specific attribute (in this case, the letter region) from the transferred binary image data (S106). In order to extract the letter region, a method disclosed in Patent Document 1 can be used; however, another existing method can be used.

The white pixel replacing unit 222 replaces black pixels in a region other than the letter region with white pixels in the binary image data (S107). By the processes in S106 and S107, as shown in FIG. 4(*d*), the letter mask image data can be obtained. The letter mask image data are the binary image data of only the letter region.

The data transferring unit 300 transfers the obtained letter mask image data to the multilevel image data processing section 130, and the transferred letter mask image data are stored in the memory unit 12 (refer to FIG. 1) of the first processing section 10 (S108). In addition, the letter mask image data are stored in the memory unit 23 (refer to FIG. 1) in the second processing section 20.

The foreground image data forming unit 131 forms foreground image data based on the multilevel image data expanded by the image data expanding unit 110 in S103 by using the letter mask image data shown in FIG. 4(*d*) (S109). The formed foreground image data are shown in FIG. 4(*e*). In this, a pixel color positioned at pixels of which the letter region is formed is extracted and the extracted color is determined to be the color of the letter. The color of the letter is determined by each pixel color, color of pixels in a predetermined rectangular region, or color of pixels of which the letter region is formed. The foreground image data are formed by the determined color.

The background image data forming unit 132 forms background image data where the letter region is eliminated based on the multilevel image data expanded by the image data expanding unit 110 in S103 by using the letter mask image data shown in FIG. 4(*d*) (S110). The formed background image data are shown in FIG. 4(*f*). In the elimination of the letter region, the color of the pixels in the letter region is replaced with a color of pixels surrounding the letter region.

The image data compressing unit 133 compresses the formed background image data by a DCT (discrete cosine transform) method to form JPEG compressed image data, and compresses the formed foreground background image data by a MMR method to form MMR compressed image data based on the letter mask image data transferred from the binary image data processing section 220 (S111). The compressed foreground image data are shown in FIG. 4(*g*), and the compressed background image data are shown in FIG. 4(*h*). In this, the foreground image data can be compressed by the DCT method and can be JPEG compressed image data.

The data transferring unit 300 transfers the compressed foreground and background image data to the synthesized file forming unit 230 (S112). The synthesized file forming unit 230 synthesizes the compressed foreground image data shown in FIG. 4(*g*) and the background image data shown in FIG. 4(*h*) with the letter mask image data shown in FIG. 4(*d*). With this, synthesized image data file shown in FIG. 4 (*i*) is formed (S113).

As shown in FIG. 4(*i*), the synthesized image data are formed by a style in which the letter region is adhered onto the background image data. That is, the compressed multilevel image data shown in FIG. 4(*a*) can be reproduced as shown in FIG. 4(*i*). The synthesized image data are formed by PDF. The format of the synthesized image data is not limited to PDF, and can be another format.

As described above, in the first embodiment of the present invention, by applying predetermined image processes to an obtained full-color document (multilevel image data), the obtained full-color document can be reproduced while maintaining high quality of the letter region of the obtained full-color document by using a small data size at high speed. The predetermined image processes are separated into simple sequential processes for pixels, for example, an image data binarizing process; and complex processes, for example, a specific attribute region extracting process (letter region extracting process) and a synthesized file forming process for synthesizing the foreground image data and the background image data with the letter mask image data.

The image processing apparatus 1 according to the first embodiment of the present invention includes the first processing section 10 and the second processing section 20. The first processing section 10 executes the simple sequential processes for pixels, for example, an image data binarizing process, an image data smoothing process (not shown), and an image data sharpening process (not shown). The second processing section 20 executes complex processes, for example, a specific attribute region extracting process (letter region extracting process) and a synthesized file forming process for synthesizing the foreground image data and the background image data with the letter mask image data. In addition, the image data to be transferred between the first and second processing sections 10 and 20 are limited to binary image data and compressed image data. Therefore, processes in the image processing apparatus 1 can be executed at high speed.

The multilevel image data obtained in S101 are JPEG compressed image data; however, the multilevel image data are not limited to the JPEG compressed image data, and can be other compressed image data or uncompressed image data. In the first embodiment of the present invention, in order to reduce the period transferring the image data between the first and second processing sections 10 and 20, the compressed image data and the binary image data are transferred. However, whether compressed image data or uncompressed image data are used can be determined by considering periods which are required to compress, expand, and transfer image data, and costs for the compression, the expansion, and the transfer of image data.

In addition, in the processes of S109 and/or S110, the foreground image data forming unit 131 can form the foreground image data of multilevel image data by using the letter mask image data which are binary image data of only the letter region obtained in the processes of S106 and S107; and the background image data forming unit 132 can form the background image data of multilevel image data by using the letter mask image data which are binary image data of only the letter region obtained in the processes of S106 and S107.

Next, referring to the drawings, second through seventh embodiments of the present invention are described. In the second through seventh embodiments of the present invention, the structure of the image processing apparatus shown in FIG. 1 is also used. However, when an element is added to the structure, the reference number of the image processing apparatus and the reference number of the sections in the image processing apparatus have corresponding suffixes.

Second Embodiment

Figure 5:
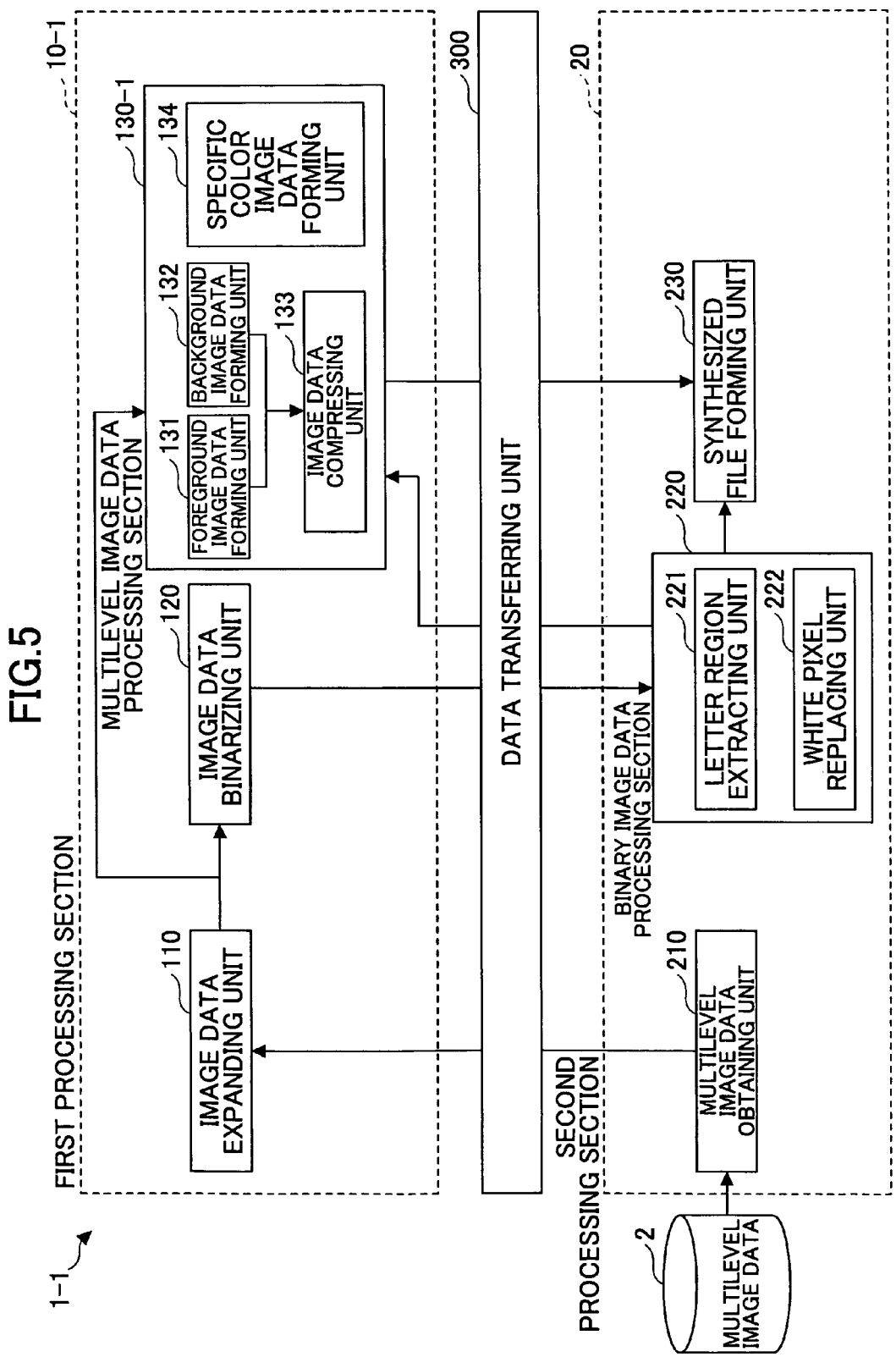
FIG. 5 is a diagram showing a functional structure of an image processing apparatus according to a second embodiment of the present invention.
Figure 6:
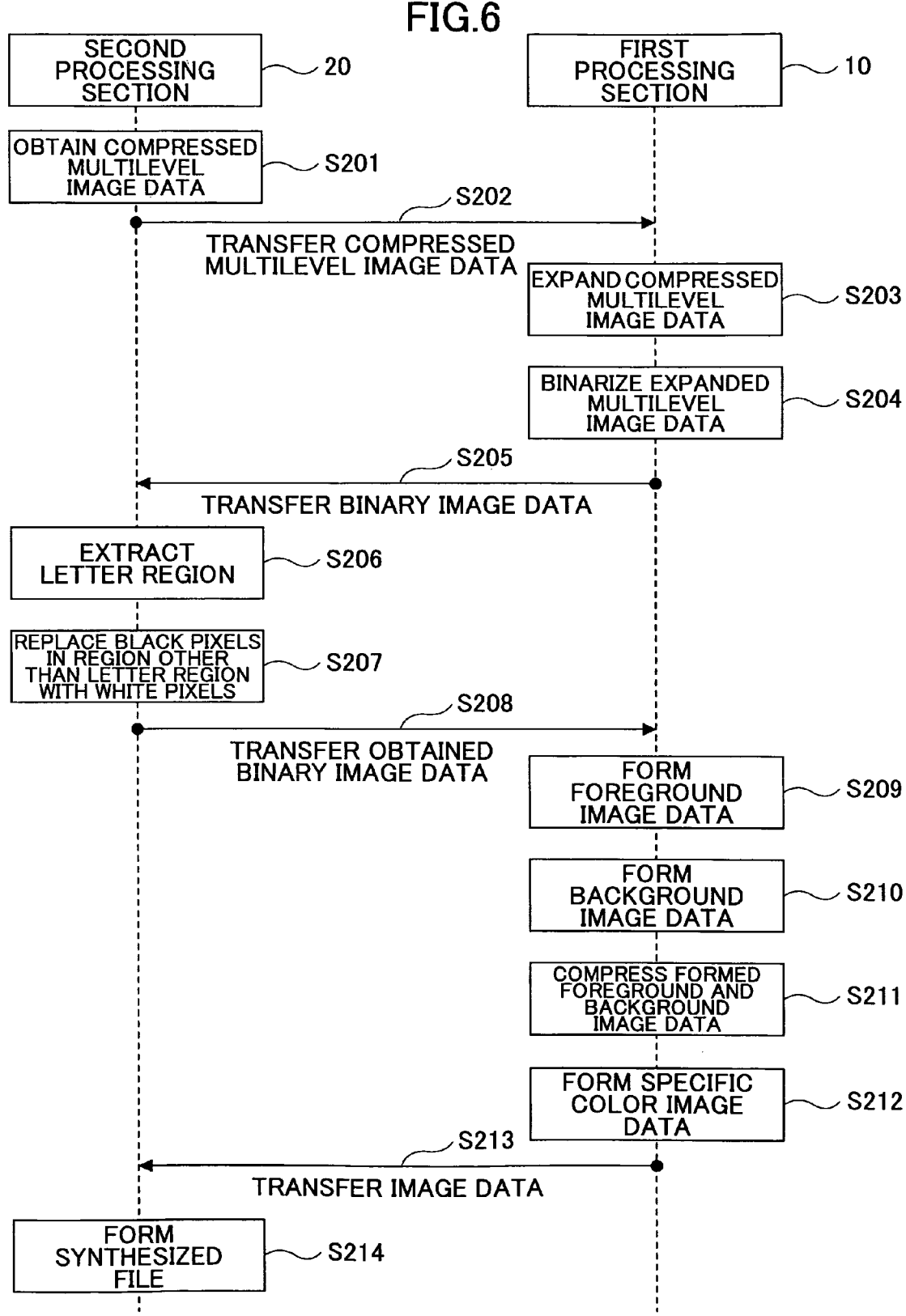
FIG. 6 is a sequence chart showing processes in the image processing apparatus shown in FIG. 5.
Figure 7:
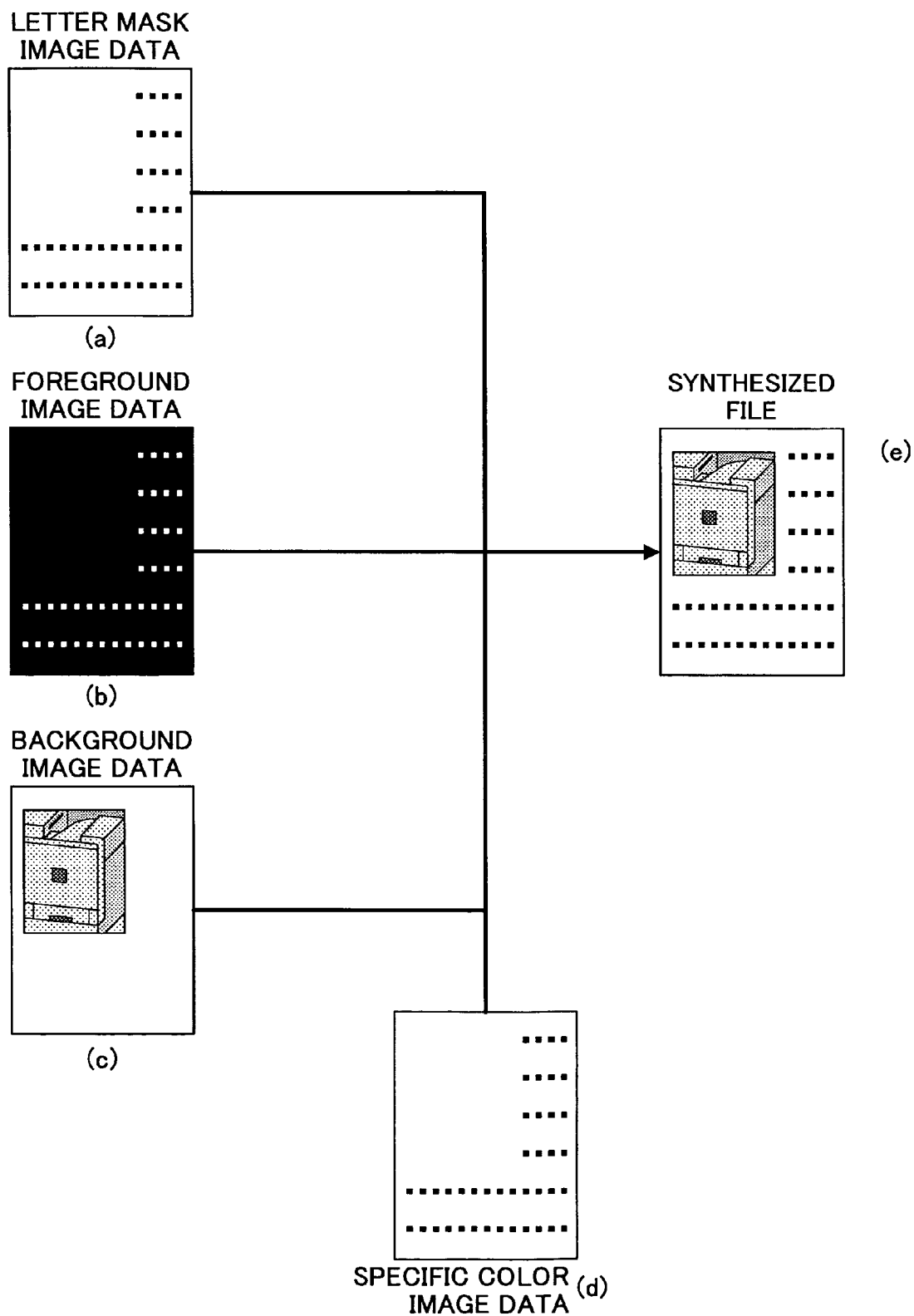
FIG. 7 is a diagram showing image data in the image processing apparatus shown in FIG. 5.

Next, referring to FIGS. 5 through 7, an image processing apparatus 1-1 according to a second embodiment of the present invention is described.

[Functional Structure of Image Processing Apparatus 1-1]

First, referring to FIG. 5, a functional structure of the image processing apparatus 1-1 according to the second embodiment of the present invention is described. FIG. 5 is a diagram showing a functional structure of the image processing apparatus 1-1.

In the first embodiment of the present invention, by applying predetermined image processes to an obtained full-color document (multilevel image data 2), the obtained full-color document can be reproduced while maintaining high quality of the letter region of the obtained full-color document by using a small data size. From the obtained multilevel image data 2, the foreground image data forming unit 131 forms the foreground image data, the background image data forming unit 132 forms the background image data, and the letter region extracting unit 221 and the white pixel replacing unit 222 form the letter mask image data. Consequently, a specific color region or a specific luminance region, for example, a black letter region is included in, for example, the foreground image data. Therefore, when compressed image data are reproduced, the black letter region may not be reproduced to be exactly black color.

For example, in a case where the image processing apparatus is a printer (or a MFP (multifunctional peripheral)) and the black letter region has a specific color and specific luminance, when the printer reproduces (prints) a read image, the black letter region of the read image may not be reproduced with the specific color and specific luminance. That is, the black letter region is reproduced by combining cyan, magenta, yellow, and black toners. Consequently, the black letter region in the printed image may blur.

In the second embodiment of the present invention, when an image is reproduced, a region having a specific color or specific luminance, for example, a black letter region can be reproduced by having a single color or specific luminance (in case of black, luminance=0).

As shown in FIG. 5, when the functional structure of the image processing apparatus 1-1 is compared with that of the image processing apparatus 1 shown in FIG. 2, the image processing apparatus 1-1 includes a multilevel image data processing section 130-1 in a first processing section 10-1 and the multilevel image data processing section 130-1 includes a specific color image data forming unit 134. The other elements are the same as those in the first embodiment of the present invention. Therefore, only the specific color image data forming unit 134 is described.

The specific color image data forming unit 134 forms specific color image data from the multilevel image data expanded by the image data expanding unit 110 by using the letter mask image data transferred from the binary image data processing section 220. That is, the specific color image data forming unit 134 determines whether the color of pixels in a specific attribute region (for example, letter region) is a specific color, for example, black. When the color is a specific color, the specific color image data forming unit 134 forms the specific color image data by the determined specific color.

For example, a black letter region in multilevel image data has irregular chroma saturation and luminance distributions. When values of the color chroma saturation and the color luminance of pixels in the black letter region are less than corresponding threshold values, the black letter region is determined to be formed of black pixels. With this, the specific color image data are formed by determining the color of the pixels to be black.

The color of the letter region is determined by each pixel color, color of pixels in a predetermined rectangular size, or color of pixels of which the letter region is formed. When the specific color is black, the black letter image data (specific color image data) can be binary image data. Consequently, the image data can be reproduced (printed) in black.

[Processes in Image Processing Apparatus 1-1]

Next, referring to FIGS. 5 through 7, processes in the image processing apparatus 1-1 are described. FIG. 6 is a sequence chart showing processes in the image processing apparatus 1-1. FIG. 7 is a diagram showing image data in the image processing apparatus 1-1.

In FIG. 7, image data shown in (a), (b), and (c) are the same as the corresponding image data shown in (d), (e), and (f) of FIG. 4. In addition, in FIG. 6, processes from S201 through S211 are the same as the processes from S101 through S111 shown in FIG. 3. Therefore, the same description is omitted. In the second embodiment of the present invention, a synthesized file shown in FIG. 7(*e*) is formed by further using specific color image data shown in FIG. 7(*d*) in addition to using the letter mask image data shown in FIG. 7(*a*), the foreground image data shown in FIG. 7(*b*), and the background image data shown in FIG. 7(*c*).

The specific color image data forming unit 134 forms black letter image data (specific color image data) shown in FIG. 7(*d*) by using the letter mask image data (binary image data of only letter region) obtained in the processes of S206 and S207 from the multilevel image data expanded in the process shown in S203 (S212).

The data transferring unit 300 transfers the foreground and background image data compressed in the process of S211 and the specific color image data (binary image data) formed in the process of S212 to the synthesized file forming unit 230 (S213). The synthesized file forming unit 230 forms a synthesized file (image data) shown in FIG. 7(*e*) by synthesizing the foreground and background image data with the letter mask image data, and further synthesizing the above synthesized image data with the specific color image data (S214).

As described above, in the second embodiment of the present invention, when image data are reproduced, the image data are processed so that a specific color region having specific luminance and chroma saturation, for example, a black letter region can be reproduced with the specific luminance and chroma saturation. That is, by using the specific color image data forming unit 134, a specific color region having specific luminance and chroma saturation can be reproduced by a single color having the specific luminance and chroma saturation.

Third Embodiment

Figure 8:
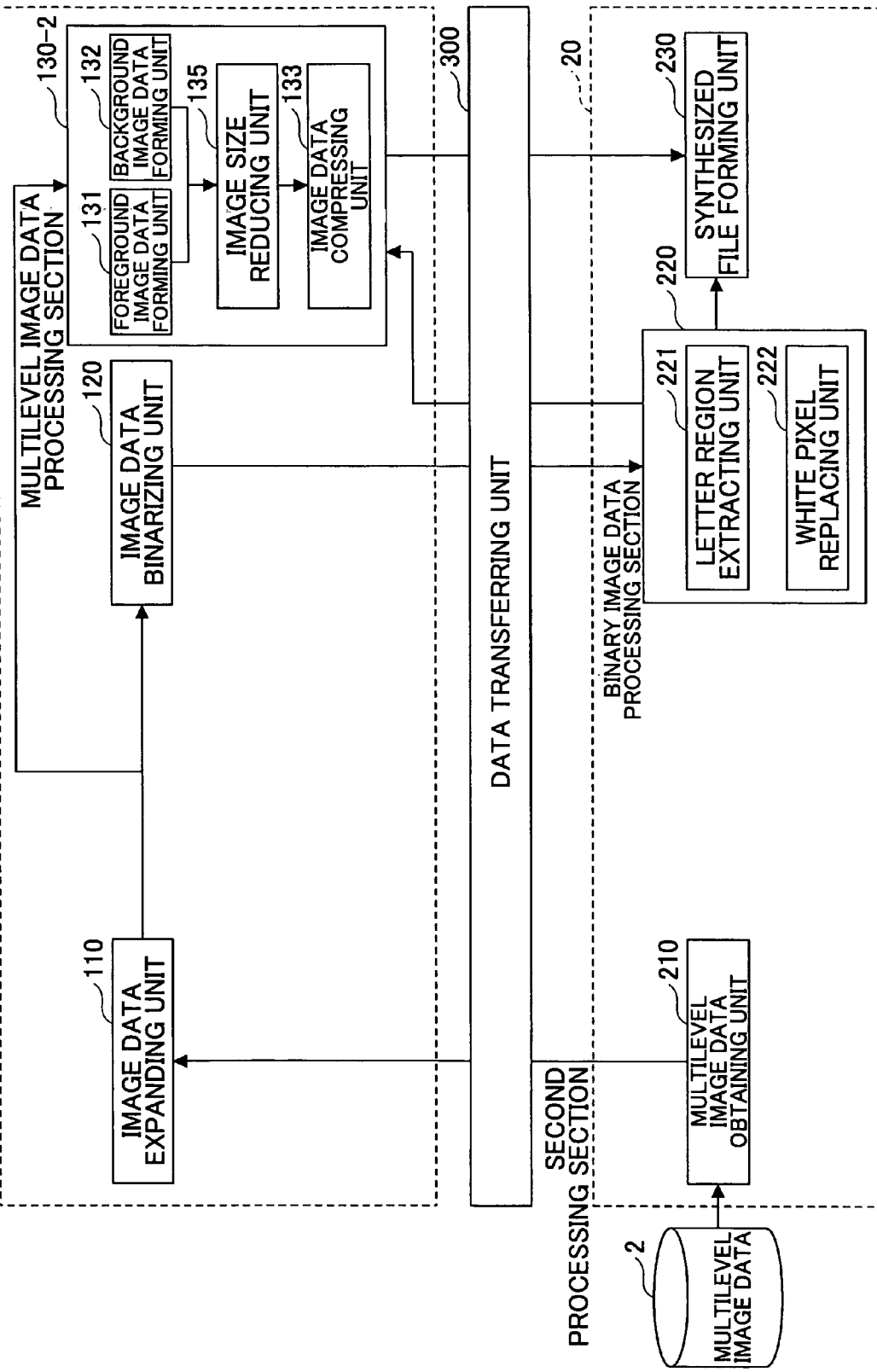
FIG. 8 is a diagram showing a functional structure of an image processing apparatus according to a third embodiment of the present invention.

Next, referring to FIG. 8, an image processing apparatus 1-2 according to a third embodiment of the present invention is described.

[Functional Structure of Image Processing Apparatus 1-2]

In the third embodiment of the present invention, the image processing apparatus 1-2 forms a synthesized file having a small size is formed at high speed.

FIG. 8 is a diagram showing a functional structure of the image processing apparatus 1-2. As shown in FIG. 8, the image processing apparatus 1-2 includes an image size reducing unit 135 in a multilevel image data processing section 130-2 of a first processing section 10-2. The other elements are the same as those shown in FIG. 2 in the first embodiment of the present invention. Therefore, the same description is omitted.

The image size reducing unit 135 reduces the size of image data. That is, the image size reducing unit 135 reduces the sizes of the image data formed by the foreground image data forming unit 131 and the background image data forming unit 132. The image data compressing unit 133 compresses the foreground and background image data whose sizes are reduced by the image size reducing unit 135.

By adding the image size reducing unit 135, a reduced size synthesized file can be formed by the synthesized file forming unit 230 at high speed while maintaining high quality image data in the letter region. The image size reducing unit 135 reduces the size of image data by operations. For the operations, a nearest neighbor method, a bilinear method, a bicubic method, or an area averaging method can be used. When the length of one side of an image before being reduced is several times the length of one side of the image after being reduced, the operations can be simplified by using the area averaging method. That is, the image size reducing process can be executed at high speed.

Fourth Embodiment

Figure 9:
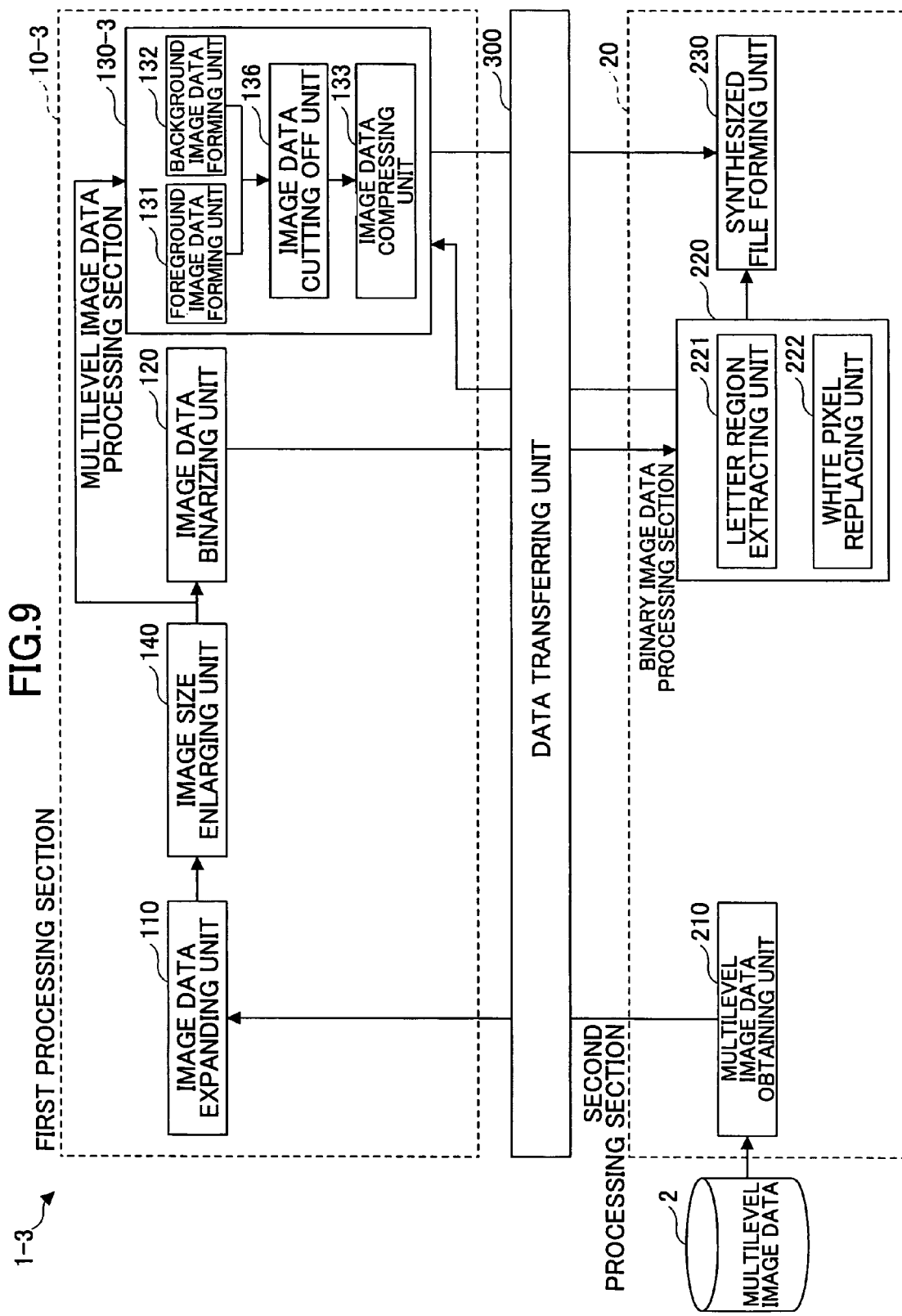
FIG. 9 is a diagram showing a functional structure of an image processing apparatus according to a fourth embodiment of the present invention.
Figure 10:
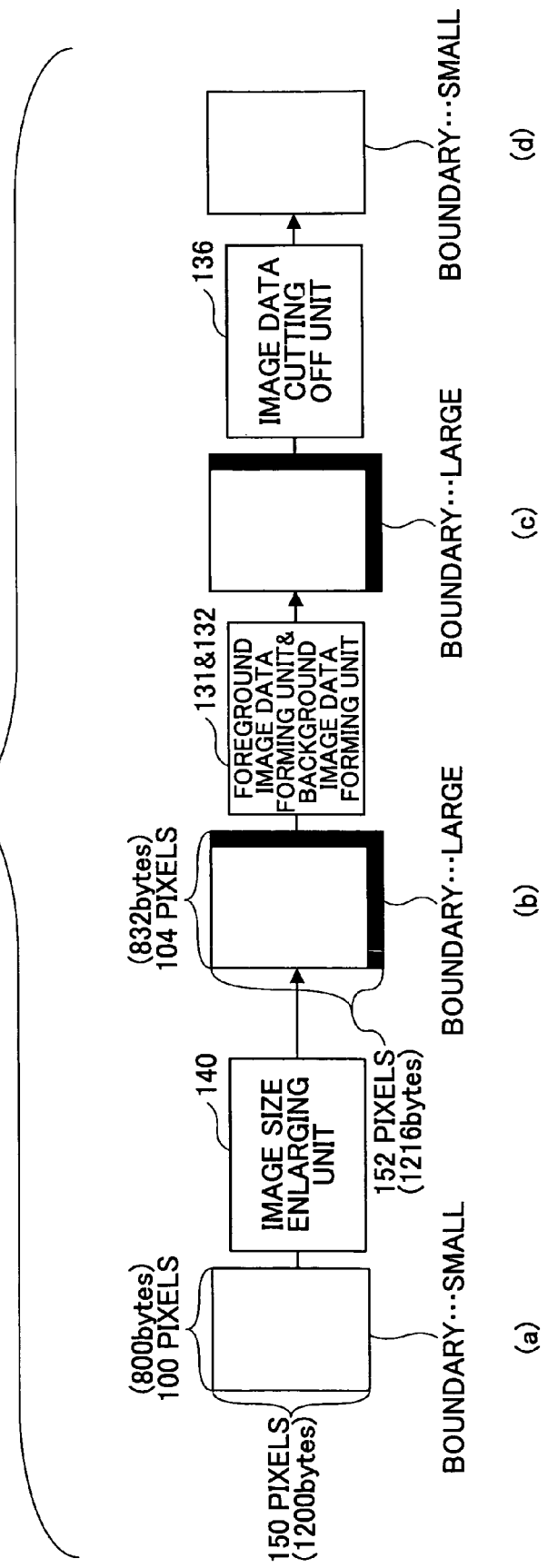
FIG. 10 is a diagram showing processes in the image processing apparatus shown in FIG. 9.

Next, referring to FIGS. 9 and 10, an image processing apparatus 1-3 according to a fourth embodiment of the present invention is described.

[Functional Structure of Image Processing Apparatus 1-3]

In the fourth embodiment of the present invention, the image processing apparatus 1-3 forms a synthesized file at high speed by considering boundary characteristics of the high-speed calculating device 11 (refer to FIG. 1).

FIG. 9 is a diagram showing a functional structure of the image processing apparatus 1-3. As shown in FIG. 9, the image processing apparatus 1-3 includes a first processing section 10-3. The first processing section 10-3 includes an image size enlarging unit 140 and a multilevel image data processing section 130-3. The multilevel image data processing section 130-3 includes an image data cutting off unit 136. The other elements are the same as those shown in FIG. 2 in the first embodiment of the present invention. Therefore, the same description is omitted.

The image size enlarging unit 140 enlarges the image size of the multilevel image data expanded by the image data expanding unit 110. The image data cutting off unit 136 cuts off a predetermined region from the multilevel image data. For example, the image data cutting off unit 136 cuts off a region enlarged by the image size enlarging unit 140.

Before describing processes in the image processing apparatus 1-3, device characteristics of the first processing section 10-3 are described.

As described above, the high-speed calculating device 11 (refer to FIG. 1) in the first processing section 10-3 is formed of a device, for example, an ASIC, an FPGA, a DSP, a configurable processor, a reconfigurable processor, or a MIMD device. The high-speed calculating device 11 has boundary characteristics in which a data accessing unit per one time is determined to be, for example, 64 bytes depending on the device. The boundary characteristics are determined by, for example, a circuit structure, a burst length of internal interfaces, and an image data compression format of the device.

In the image processing apparatus 1-3, data boundary adjustment processes (described below in detail) are applied to the multilevel-image data to be processed by the image size enlarging unit 140 and the image data cutting off unit 136 by considering the boundary characteristics of the device.

[Processes in Image Processing Apparatus 1-3]

FIG. 10 is a diagram showing processes in the image processing apparatus 1-3. In FIG. 10, the data boundary adjustment processes are applied to multilevel image data expanded by the image data expanding unit 110 shown in FIG. 10(*a*). In FIG. 10(*a*), the multilevel image data have 100 pixels (800 bytes) in the horizontal direction and 150 pixels (1200 bytes) in the vertical direction in which the data size per pixel is 8 bytes. In FIG. 10(*a*), the boundary of the multilevel image data is small (normal). In addition, the boundary characteristics of the high-speed calculating device 11 are 64 bytes. That is, the data accessing unit per one time is 64 bytes.

First, the image size enlarging unit 140 enlarges the image size of the multilevel image data expanded by the image data expanding unit 110. The high-speed calculating device 11 can process the multilevel image data when the image size of the multilevel image data is a multiple number of 64 bytes. Therefore, the image size enlarging unit 140 enlarges the image size of the multilevel image data so that the image size of the multilevel image data shown in FIG. 10(a) becomes a multiple number of 64 bytes. Specifically, as shown in FIG. 10(b), for example, the image size of the multilevel image data is made to be 104 pixels (832 bytes) in the horizontal direction and 152 pixels (1216 bytes) in the vertical direction. In FIG. 10 (b), black pixels are attached to a region where the image size is enlarged. However, the pixels to be attached are not limited to the black pixels, and can be white pixels or some color pixels equal to adjacent pixels. When some color adjacent pixels are attached, the multilevel image data are smoothly processed. In FIG. 10(b), the boundary of the multilevel image data is large.

Next, the processes in the foreground image data forming unit 131 and the background image data forming unit 132 are applied to the multilevel image data whose image size is enlarged, and image data shown in FIG. 10(c) are obtained. The image data cutting off unit 136 cuts off the enlarged region of the image data shown in FIG. 10(c). With this, as shown in FIG. 10(d), the image size of the multilevel image data is returned to the original image size.

As described above, in the image processing apparatus 1-3, the data boundary adjustment processes are applied to the multilevel image data expanded by the image data expanding unit 110 shown in FIG. 10(a). Therefore, in the fourth embodiment of the present invention, full-color image data can be reproduced at high speed while maintaining high quality of the letter region, when the boundary characteristics of the high-speed calculating device 11 are considered.

That is, in a case where the high-speed calculating device 11 in the first processing section 10-3 can operate at high speed when the data boundary adjustment processes are applied to the high-speed calculating device 11, the processes can be executed at high speed by the image size enlarging unit 140 and the image data cutting off unit 136.

That is, the image size enlarging unit 140 can adjust the boundary of the image data based on the boundary characteristics of the high-speed calculating device 11.

Fifth Embodiment

Figure 11:
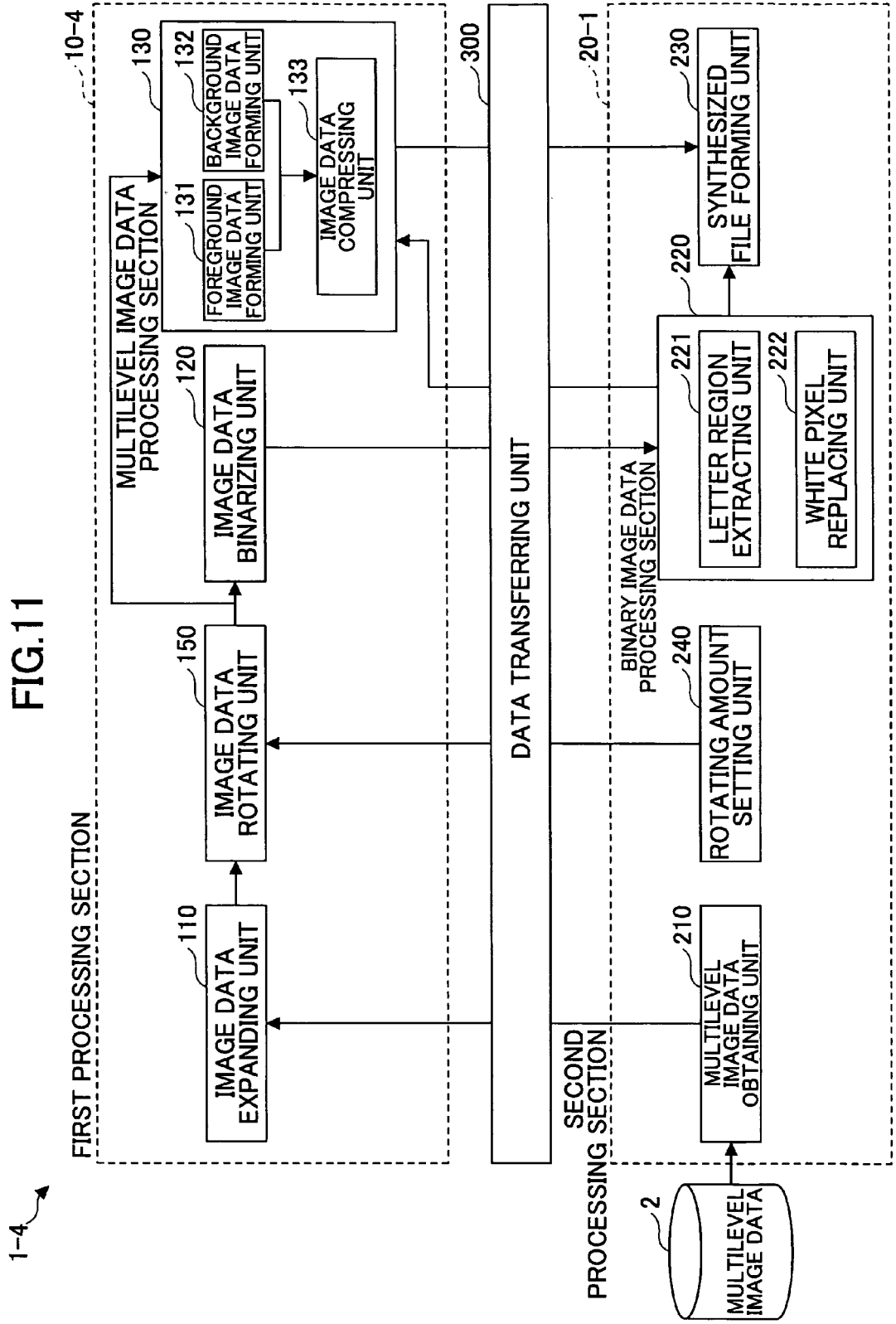
FIG. 11 is a diagram showing a functional structure of an image processing apparatus according to a fifth embodiment of the present invention.

Next, referring to FIG. 11, an image processing apparatus 1-4 according to a fifth embodiment of the present invention is described.

[Functional Structure of Image Processing Apparatus 1-4]

In the fifth embodiment of the present invention, the image processing apparatus 1-4 rotates the multilevel image data and processes the rotated multilevel image data at high speed.

FIG. 11 is a diagram showing a functional structure of the image processing apparatus 1-4. As shown in FIG. 11, the image processing apparatus 1-4 includes an image data rotating unit 150 in a first processing section 10-4 and a rotating amount setting unit 240 in a second processing section 20-1. The other elements are the same as those shown in FIG. 2 in the first embodiment of the present invention. Therefore, the same description is omitted.

The rotating amount setting unit 240 sets a rotating amount of image data. For example, the rotating amount is set by a user input on an operating section (not shown) of the image processing apparatus 1-4; or necessity of the rotation of the image data and the rotating amount are set by analyzing the multilevel image data obtained by the multilevel image data obtaining unit 210. The image data rotating unit 150 rotates the multilevel image data based on the rotating amount set by the rotating amount setting unit 240.

In the fifth embodiment of the present invention, the multilevel image data are rotated and the processes are applied to the rotated multilevel image data at high speed. With this, the processed result of the rotated multilevel image data can be obtained at high speed. In this, the memory unit 12 (refer to FIG. 1) in the first processing section 10-4 can store information of the rotating amount by receiving the information from the second processing section 20-1.

Sixth Embodiment

Next, referring to FIG. 12, an image processing apparatus 1-5 according to a sixth embodiment of the present invention is described.

[Functional Structure of Image Processing Apparatus 1-5]

In the sixth embodiment of the present invention, the image processing apparatus 1-5 applies correction processes to multilevel image data, and processes the corrected multilevel image data at high speed. FIG. 12 is a diagram showing a functional structure of the image processing apparatus 1-5. As shown in FIG. 12, the image processing apparatus 1-5 includes an image data correcting unit 160 in a first processing section 10-5. The other elements are the same as those shown in FIG. 2 in the first embodiment of the present invention. Therefore, the same description is omitted.

The image data correcting unit 160 applies correction processes to the multilevel image data expanded by the image data expanding unit 110. For example, the image data correcting unit 160 applies image correction processes such as an image sharpening process, an image smoothing process, a contrast adjusting process, a luminance adjusting process, and an HSV (hue, saturation, value) correcting process to the multilevel image data expanded by the image data expanding unit 110. The image sharpening process increases readability of the letter region of the image data. The image smoothing process increases image quality of binary image data to be formed by the image data binarizing unit 120. The contrast adjusting process, the luminance adjusting process, and the HSV correcting process increase image quality of the entire image data corresponding to a user's intention. The image data correcting unit 160 can use any one of the above processes, or plural above processes by combining them.

As described above, in the sixth embodiment of the present invention, the multilevel image data can be reproduced at high speed by having the image data correcting processes applied. Since the image data correcting unit 160 is in the first processing section 10-5, image data can be output with high quality by having the image data correcting processes applied.

Seventh Embodiment

Next, referring to FIG. 13, an image processing apparatus 1-6 according to a seventh embodiment of the present invention is described.

[Functional Structure of Image Processing Apparatus 1-6]

In the seventh embodiment of the present invention, the image processing apparatus 1-6 can apply processes to the multilevel image data 2 at high speed even if the multilevel image data 2 are compressed image data which cannot be expanded by the image data expanding unit 110 in the first processing section 10. FIG. 13 is a diagram showing a functional structure of the image processing apparatus 1-6. As shown in FIG. 13, the image processing apparatus 1-6 includes a compressed image data capable of being expanded determining unit 250 and a general image data expanding unit 260 in a second processing section 20-2. The other elements are the same as those shown in FIG. 2 in the first embodiment of the present invention. Therefore, the same description is omitted.

The compressed image data capable of being expanded determining unit 250 determines whether the multilevel image data 2 obtained by the multilevel image data obtaining unit 210 can be expanded by the image data expanding unit 110. When the compressed image data capable of being expanded determining unit 250 determines that the multilevel image data 2 obtained by the multilevel image data obtaining unit 210 can be expanded by the image data expanding unit 110, the image data expanding unit 110 expands the obtained multilevel image data. When the compressed image data capable of being expanded determining unit 250 determines that the multilevel image data 2 obtained by the multilevel image data obtaining unit 210 cannot be expanded by the image data expanding unit 110, the general image data expanding unit 260 expands the obtained multilevel image data by using a general operation processing program.

Since the high-speed calculating device 11 is formed of an ASIC, an FPGA, a DSP, a configurable processor, a reconfigurable processor, or a MIMD device, the above devices do not always correspond to various kinds of compressed image data. Therefore, when the image processing apparatus 1-6 includes the compressed image data capable of being expanded determining unit 250 and the general image data expanding unit 260 in the second processing section 20-2, the image processing apparatus 1-6 can correspond to the various kinds of the compressed image data.

That is, even if the multilevel image data 2 are compressed image data which cannot be expanded by the image data expanding unit 110 in the first processing section 10, the general image data expanding unit 260 in the second processing section 20-2 can expand the compressed image data. With this, the processes in the image processing apparatus 1-6 can be normally executed.

Further, the present invention is not limited to the specifically disclosed embodiments, and variations and modifications may be made without departing from the scope of the present invention.

The present invention is based on Japanese Priority Patent Application No. 2006-352520, filed on Dec. 27, 2006, with the Japanese Patent Office, the entire contents of which are hereby incorporated herein by reference.

What is claimed is:

1. An image processing apparatus which applies processes to input image data, comprising:
   a first processing section which applies first processes to the input image data by a specific calculating device, the input image data being multi-level image data, the first processing section including,
   an image data binarizing unit for forming binary image data from the multi-level image data, and
   a multi-level image data processing section for applying a first calculation process to the multi-level image data; and
   a second processing section which applies second processes to the input image data by a general-purpose processing unit, the first processing section configured to perform the second processes, the second processes being processes that are executed by the general-purpose processing unit at a speed higher than a speed of the first processing section executing the second processes, the second processing section including,
   a binary image data processing section for applying a second calculation process to the binary image data formed by the image data binarizing unit; and
   a data transferring unit for transferring data from the first processing section to the second processing section and from the second processing section to the first processing section.

2. The image processing apparatus as claimed in claim 1, wherein:
   the second processing section further includes a synthesized file forming unit for forming a synthesized file by synthesizing a result processed by the multilevel image data processing section with a result processed by the binary image data processing section.

3. The image processing apparatus as claimed in claim 1, wherein the data to be transferred by the data transferring unit are compressed data and/or binary data.

4. The image processing apparatus as claimed in claim 1, wherein:
   the binary image data processing section includes an attribute region extracting unit for extracting a predetermined attribute region from the binary image data; and a mask image data forming unit for forming mask image data for identifying the predetermined attribute region by replacing pixels in a region other than the predetermined attribute region with white pixels.

5. The image processing apparatus as claimed in claim 4, wherein:
   the multilevel image data processing section includes a foreground image data forming unit for forming foreground image data of the multilevel image data by using the mask image data formed by the mask image data forming unit; a background image data forming unit for forming background image data of the multilevel image data by using the mask image data formed by the mask image data forming unit; and an image data compressing unit for compressing the foreground image data, the background image data, and the mask image data.

6. The image processing apparatus as claimed in claim 4, wherein:
   the multilevel image data processing section further includes a specific color image data forming unit for forming specific color image data by using the mask image data formed by the mask image data forming unit.

7. The image processing apparatus as claimed in claim 5, wherein:
   the multilevel image data processing section further includes an image size reducing unit for reducing the image size of image data, wherein the image size reducing unit reduces the image sizes of the foreground image data and the background image data; and the image data compressing unit compresses the foreground image data and the background image data whose sizes are reduced by the image size reducing unit.

8. The image processing apparatus as claimed in claim 1, wherein:
   the first processing section further includes an image data expanding unit for expanding input compressed multi-level image data transferred from the second processing section.

9. The image processing apparatus as claimed in claim 8, wherein:
   the second processing section further includes an image data capable of being expanded determining unit for determining whether the multilevel image data can be expanded by the image data expanding unit in the first processing section; and a general image data expanding unit which can expand the compressed multilevel image data; wherein when the image data capable of being expanded determining unit determines that the compressed multilevel image data cannot be expanded by the image data expanding unit in the first processing section, the general image data expanding unit in the second processing section expands the compressed multilevel image data.

10. The image processing apparatus as claimed in claim 8, wherein:
the first processing section further includes an image size enlarging unit for enlarging the image size of the multilevel image data expanded by the image data expanding unit; and an image data cutting off unit for cutting off a region enlarged by the image size enlarging unit from the enlarged size of the multilevel image data; wherein the first processing section applies processes to the multilevel image data whose size is enlarged by the image size enlarging unit, and the image data cutting off unit cuts off a region enlarged by the image size enlarging unit from the enlarged size of the multilevel image data.

11. The image processing apparatus as claimed in claim 8, wherein:
the first processing section further includes an image data rotating unit for rotating the direction of the multilevel image data expanded by the image data expanding unit; and the second processing section further includes an rotating amount setting unit for setting the rotating amount of the direction of the multilevel image data; wherein the image data rotating unit rotates the direction of the multilevel image data expanded by the image data expanding unit based on a rotating amount set by the rotating amount setting unit.

12. The image processing apparatus as claimed in claim 8, wherein:
the first processing section further includes an image data correcting unit for correcting the multilevel image data expanded by the image data expanding unit.

13. The image processing apparatus as claimed in claim 1, wherein:
the specific calculating device is one of an ASIC, an FPGA, a DSP, a configurable processor, a reconfigurable processor, and a MIMD device.

14. An image processing method for applying processes to input image data, the method comprising:
applying, in a first processing section, first processes to the input image data by a specific calculating device, the input image data being multi-level image data, the applying first processes step including,
an image data binarizing step that forms binary image data from the multi-level image data, and
a multi-level image data processing step that applies a first calculation process to the multi-level image data; and
applying, in a second processing section, second processes to the input image data by a general-purpose processing unit, the first processing section configured to perform the second processes, the second processes being processes that are executed by the general-purpose processing unit at a speed higher than a speed of the first processing section executing the second processes, the applying second processes step including,
a binary image data processing step that applies a second calculation process to the binary image data formed by the image data binarizing step; and
a data transferring step for transferring data from the first processing section to the second processing section and from the second processing section to the first processing section.

15. The image processing method as claimed in claim 14, wherein the applying second processes step includes a synthesized file forming step for forming a synthesized file by synthesizing a result processed by the multilevel image data processing step with a result processed by the binary image data processing step.

16. The image processing method as claimed in claim 14, wherein the data to be transferred by the data transferring step are compressed data and/or binary data.

17. The image processing method as claimed in claim 14, wherein the applying second processing step includes an attribute region extracting step for extracting a predetermined attribute region from the binary image data formed by the binary image data processing step; and a mask image data forming step for forming mask image data for identifying the predetermined attribute region by replacing pixels in a region other than the predetermined attribute region with white pixels.

18. The image processing method as claimed in claim 17, wherein the applying first processing step includes a foreground image data forming step for forming foreground image data of the input multilevel image data by using the mask image data formed by the mask image data forming step; a background image data forming step for forming background image data of the input multilevel image data by using the mask image data formed at the mask image data forming step; and an image data compressing step for compressing the foreground image data, the background image data, and the mask image data.

19. The image processing method as claimed in claim 17, wherein the applying first processing step includes a specific color image data forming step for forming specific color image data by using the mask image data formed at the mask image data forming step.

* * * * *